(12) United States Patent
Hasting et al.

(10) Patent No.: US 10,816,086 B2
(45) Date of Patent: Oct. 27, 2020

(54) POWER GEARBOX GEAR ARRANGEMENT

(71) Applicant: General Electric Company, Schenectady, NY (US)

(72) Inventors: William Howard Hasting, Cincinnati, OH (US); Donald Albert Bradley, Royal Oak, MI (US); Randy Thomas Antelo, Aurora, CO (US)

(73) Assignee: General Electric Company, Schenectady, NY (US)

( * ) Notice: Subject to any disclaimer, the term of this patent is extended or adjusted under 35 U.S.C. 154(b) by 266 days.

(21) Appl. No.: 15/675,878

(22) Filed: Aug. 14, 2017

(65) Prior Publication Data

US 2019/0048994 A1 Feb. 14, 2019

(51) Int. Cl.

| | |
|---|---|
| *F16H 57/08* | (2006.01) |
| *F16H 57/00* | (2012.01) |
| *F16C 19/28* | (2006.01) |
| *F02C 7/36* | (2006.01) |
| *F16H 57/04* | (2010.01) |
| *F16H 1/28* | (2006.01) |

(52) U.S. Cl.
CPC ............. *F16H 57/08* (2013.01); *F02C 7/36* (2013.01); *F16C 19/28* (2013.01); *F16H 57/0031* (2013.01); *F16H 57/0479* (2013.01); *F16H 57/082* (2013.01); *F05D 2260/40311* (2013.01); *F16C 2361/61* (2013.01); *F16H 1/28* (2013.01); *F16H 2057/085* (2013.01)

(58) Field of Classification Search
CPC .... F02C 7/36; F16H 2057/085; F16H 57/082; F16H 57/08
See application file for complete search history.

(56) References Cited

U.S. PATENT DOCUMENTS

| | | |
|---|---|---|
| 2,860,479 A | 11/1958 | Wheater |
| 6,170,252 B1 | 1/2001 | Van Duyn |
| 6,897,578 B1 | 5/2005 | Olsen et al. |
| 7,752,834 B2 | 7/2010 | Addis |
| 7,884,493 B2 | 2/2011 | Buskirk et al. |
| 7,959,532 B2 | 6/2011 | Suciu et al. |
| 8,172,717 B2 | 5/2012 | Lopez et al. |
| 8,237,298 B2 | 8/2012 | Lemmers, Jr. |
| 8,508,062 B2 | 8/2013 | Gozdawa |
| 8,550,957 B2 | 10/2013 | Erno et al. |
| 10,267,365 B2 | 4/2019 | Hasting |

(Continued)

FOREIGN PATENT DOCUMENTS

| | | |
|---|---|---|
| CA | 2714845 A1 | 3/2011 |
| CN | 101713382 A | 5/2010 |

(Continued)

OTHER PUBLICATIONS

Partial European Search Report and Opinion issued in connection with corresponding EP Application No. 18188438.8 dated Oct. 30, 2018.

(Continued)

*Primary Examiner* — Erin D Bishop
(74) *Attorney, Agent, or Firm* — McGarry Bair PC

(57) ABSTRACT

An apparatus and a method of retaining a bearing assembly having a bore to a shaft received within the bore, the method comprising physically limiting the axial movement of the bearing assembly on the shaft by a retainer mounted to an end of the shaft and having a portion extending radially beyond the shaft and into an axial path of the bearing assembly.

10 Claims, 5 Drawing Sheets

(56) References Cited

U.S. PATENT DOCUMENTS

| | | |
|---|---|---|
| 2013/0269470 A1 | 10/2013 | Ohba et al. |
| 2013/0269479 A1 | 10/2013 | van der Merwe et al. |
| 2016/0333786 A1 | 11/2016 | Glynn et al. |
| 2016/0377170 A1 | 12/2016 | Leimann |
| 2017/0089218 A1 | 3/2017 | Hasting et al. |

FOREIGN PATENT DOCUMENTS

| | | | |
|---|---|---|---|
| CN | 106150701 | A | 11/2016 |
| CN | 107013340 | A | 8/2017 |
| CN | 107023662 | A | 8/2017 |
| DE | 10 2014 226 145 | A1 | 6/2016 |
| EP | 1010878 | A2 | 6/2000 |
| EP | 2 644 939 | A1 | 10/2013 |
| GB | 872620 | A | 7/1961 |
| GB | 2514167 | A | 11/2014 |
| JP | H04-62949 | U | 5/1992 |
| WO | 20141845831 | W | 11/2014 |

OTHER PUBLICATIONS

Extended European Search Report and Opinion issued in connection with corresponding EP Application No. 18188438.8 dated Feb. 5, 2019.

Patent Office of SIPO of P.R.C., First Office Action re Chinese Patent Application No. 201810913840.5, Oct. 9, 2019, 10 pages, China.

POWER GEARBOX GEAR ARRANGEMENT

BACKGROUND OF THE INVENTION

Turbine engines, and particularly gas or combustion turbine engines, are rotary engines that extract energy from a flow of combusted gases passing through the engine onto a multitude of rotating turbine blades.

A turbine can rotationally drive a turbine shaft, which can rotationally drive a fan through a power gearbox of an epicyclic gearing arrangement. The power gearbox can rotatably support a sun gear disposed centrally with respect to a ring gear and a plurality of planet gears, which are disposed around the sun gear and engage between the sun gear and the ring gear. Each planet gear meshes with the sun gear and with the ring gear. Each planet gear is rotatable on its own rolling element that is mounted on a carrier within the power gearbox.

BRIEF DESCRIPTION OF THE INVENTION

In one aspect, the present disclosure relates to a gear assembly including an inner ring having an outer surface defining an inner race and an inner surface defining a bore and having a first end defining a first opening for the bore and a second end, axially spaced from the first end, defining a second opening to the bore, an outer ring having an inner surface defining an outer race circumscribing and confronting the inner race and an outer surface with a plurality of teeth, a plurality of rolling elements positioned between the inner and outer races, a shaft at least partially extending through the bore and having at least one end, a retainer located adjacent the at least one end, a carrier circumscribing at least a portion of the shaft or the retainer, and a fastener securely connecting the retainer and shaft and physically limiting the axial movement of the carrier and the inner ring.

In another aspect, the present disclosure relates to a gear assembly including an inner ring having an outer surface defining an inner race and an inner surface defining a bore and having a first end defining a first opening for the bore and a second end, axially spaced from the first end, defining a second opening to the bore, an outer ring having an inner surface defining an outer race circumscribing and confronting the inner race and an outer surface with a plurality of teeth, a plurality of rolling elements positioned between the inner and outer races, a shaft extending through the bore and having at least one end, a retainer located adjacent the least one end, a carrier circumscribing at least a portion of the shaft, and a fastener securely connecting the retainer and shaft and physically limiting the axial movement of the carrier and the inner ring.

In yet another aspect, the present disclosure relates to a gear assembly including an inner ring having an outer surface defining an inner race and an inner surface defining a bore and having a first end defining a first opening for the bore and a second end, axially spaced from the first end, defining a second opening to the bore, an outer ring having an inner surface defining an outer race circumscribing and confronting the inner race and an outer surface with a plurality of teeth, a plurality of rolling elements positioned between the inner and outer races, first and second support elements disposed about the inner surface of the inner ring and adjacent a portion of the first end and second end, first and second retainers disposed adjacent the first and second support elements about the first end and second end, a carrier circumscribing the first and second retainers, and a fastener securely connecting the first and second retainers and physically limiting the axial movement of the carrier and inner ring on the retainers.

In yet another aspect, the present disclosure relates to a method of retaining a rolling element assembly having a bore to a shaft received within the bore, the method including physically limiting the axially movement of the rolling element assembly on the shaft by a retainer mounted to an end of the shaft and having a portion extending radially beyond the shaft and into an axial path of the rolling element assembly.

DETAILED DESCRIPTION OF THE INVENTION

Figure 1:
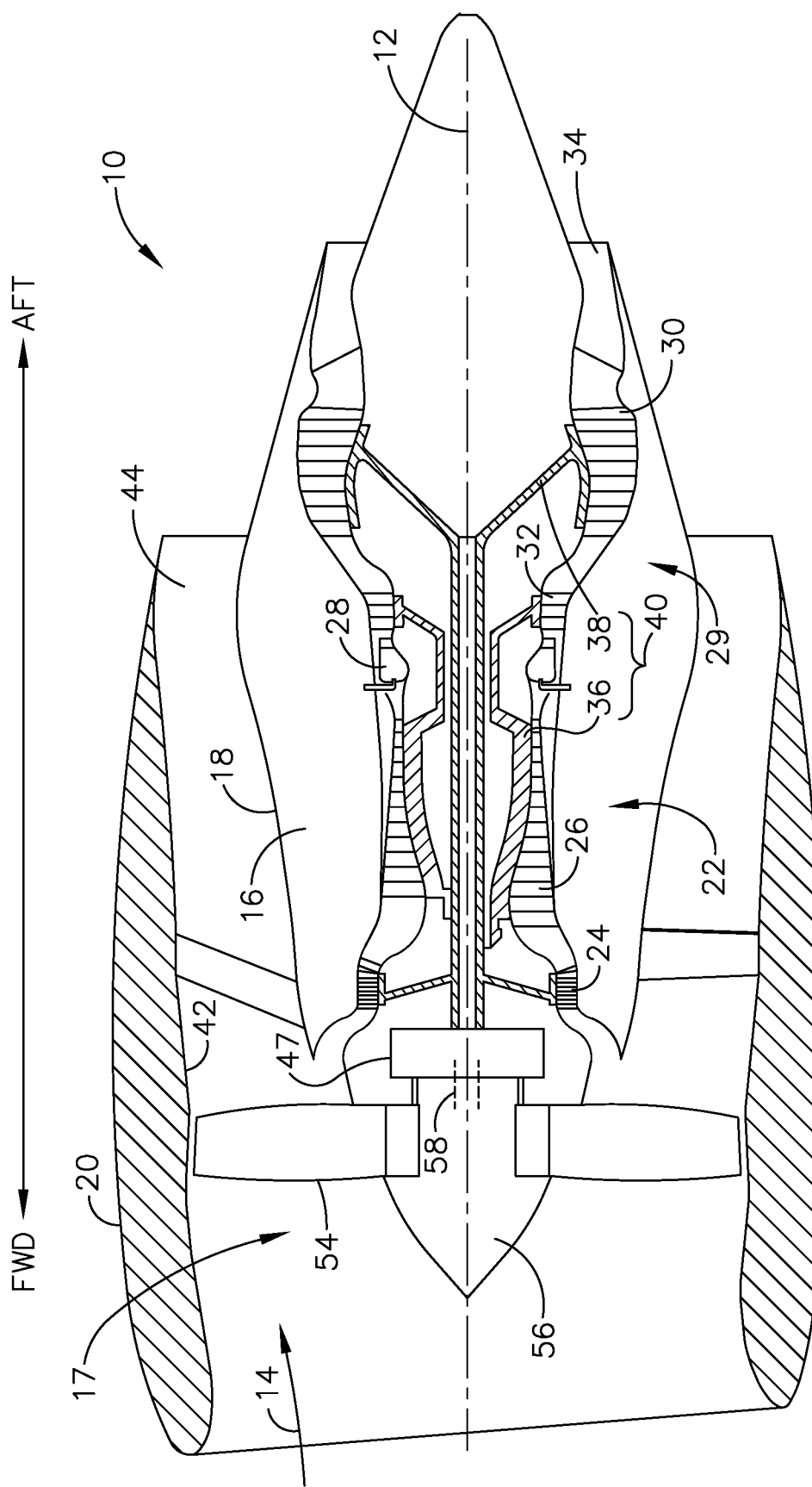
FIG. 1 is a schematic cross-sectional diagram of a gas turbine engine for an aircraft.

Aspects of the disclosure described herein are directed to an arrangement for an epicyclic gear assembly in a power gearbox in a turbine engine. For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a portion of a turbine engine 10 for an aircraft. The turbine engine 10 has a longitudinally extending axis or centerline 12 extending from forward (FWD) to aft (AFT). A flow path 14 can be defined along the centerline 12. A turbine engine core 16, a fan assembly 17, and a nacelle 20 can be included in the turbine engine 10. The turbine engine core 16 can include a compressor section 22 having low pressure (LP) and high pressure (HP) compressor(s) 24, 26, a combustion section 28, a turbine section 29 having low pressure (LP) and high pressure (HP) turbine(s) 30, 32, and exhaust section 34. An inner core cowl 18, sometimes referred to as a shroud, radially surrounds the turbine engine core 16.

A high pressure (HP) shaft or spool 36 is disposed coaxially about the centerline 12 of the engine 10 drivingly connects the HP turbine 32 to the HP compressor 26. A low pressure (LP) shaft or spool 38, is disposed coaxially about the centerline 12 of the engine 10 within the larger diameter annular HP spool 36, drivingly connects the LP turbine 30 to the LP compressor 24. The spools 36, 38 are rotatable about the engine centerline 12 and couple to a plurality of rotatable blades or elements, which can collectively define and is hereinafter referred to as the engine rotor 40.

A nacelle 20 surrounds the engine 10 including the inner core cowl 18. In this manner, the nacelle 20 forms an outer cowl 42 radially surrounding the inner core cowl 18. The outer cowl 42 is spaced from the inner cowl 18 to form an annular passage 44 between the inner core cowl 18 and the outer cowl 42. The annular passage 44 can be a bypass duct, permitting a portion an airflow along the flow path 14 to bypass the engine core 16. The annular passage 44 characterizes and forms a generally forward-to-aft bypass airflow path.

Fan assembly 17 generally has a plurality of fan blades 54 coupled to a spinner 56 in a spaced apart manner. The fan blades 54 extend outwardly from the spinner 56 in a generally radial direction. Each fan blade 54 is rotatable relative to the spinner 56 about the centerline 12 via a fan shaft 58 that is driven by the LP spool 38 via a power gearbox 47. The power gearbox 47 includes a gear assembly having a plurality of gears for adjusting the rotational speed of the fan shaft 58 and thus the fan 52 relative to the LP spool 38.

Figure 2:
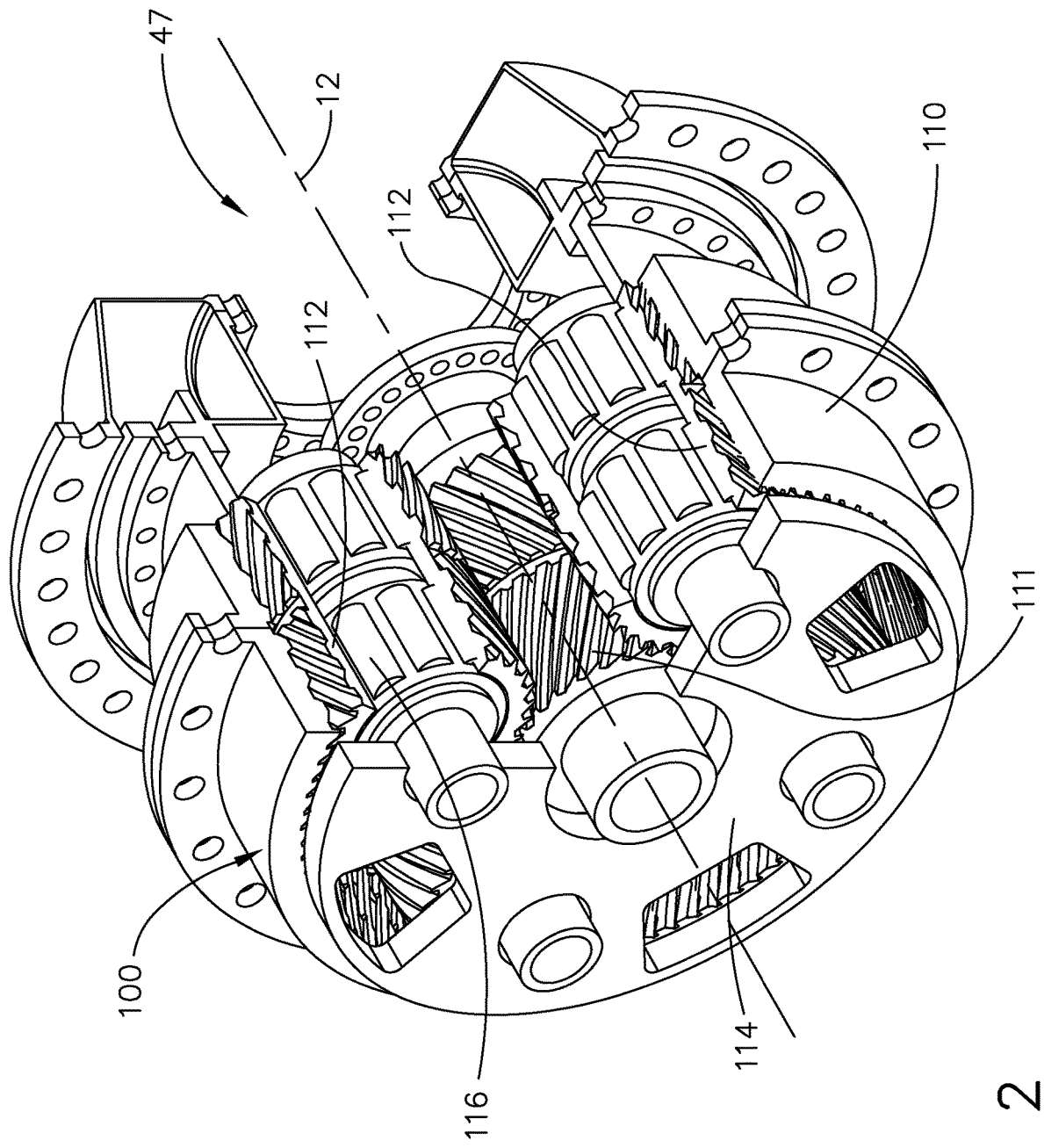
FIG. 2 is a perspective view of a gear assembly for the gas turbine engine in FIG. 1.

FIG. 2 illustrates an exemplary gear assembly 100 for a power gearbox 47 which can be any epicyclic gear assembly commonly known in the art. The gear assembly 100 can include a centrally-located sun gear 111 that is rotatable about the centerline 12. One or more planet gears 112 can surround and engage, or mesh, with the sun gear 111. The gear assembly 100 can further include a ring gear 110 disposed circumferentially around the sun gear 111 and planet gears 112 and engages with the planet gears 112. Collectively the sun gear 111, the planet gears 112, and the ring gear 110 are housed by carrier 114 and constitute the gear assembly 100 associated with the power gearbox 47. The particular arrangement of the gear assembly 100 can be performed in any number of conventional manners, any one of which being suitable for illustrating exemplary embodiments of the present disclosure.

Figure 3:
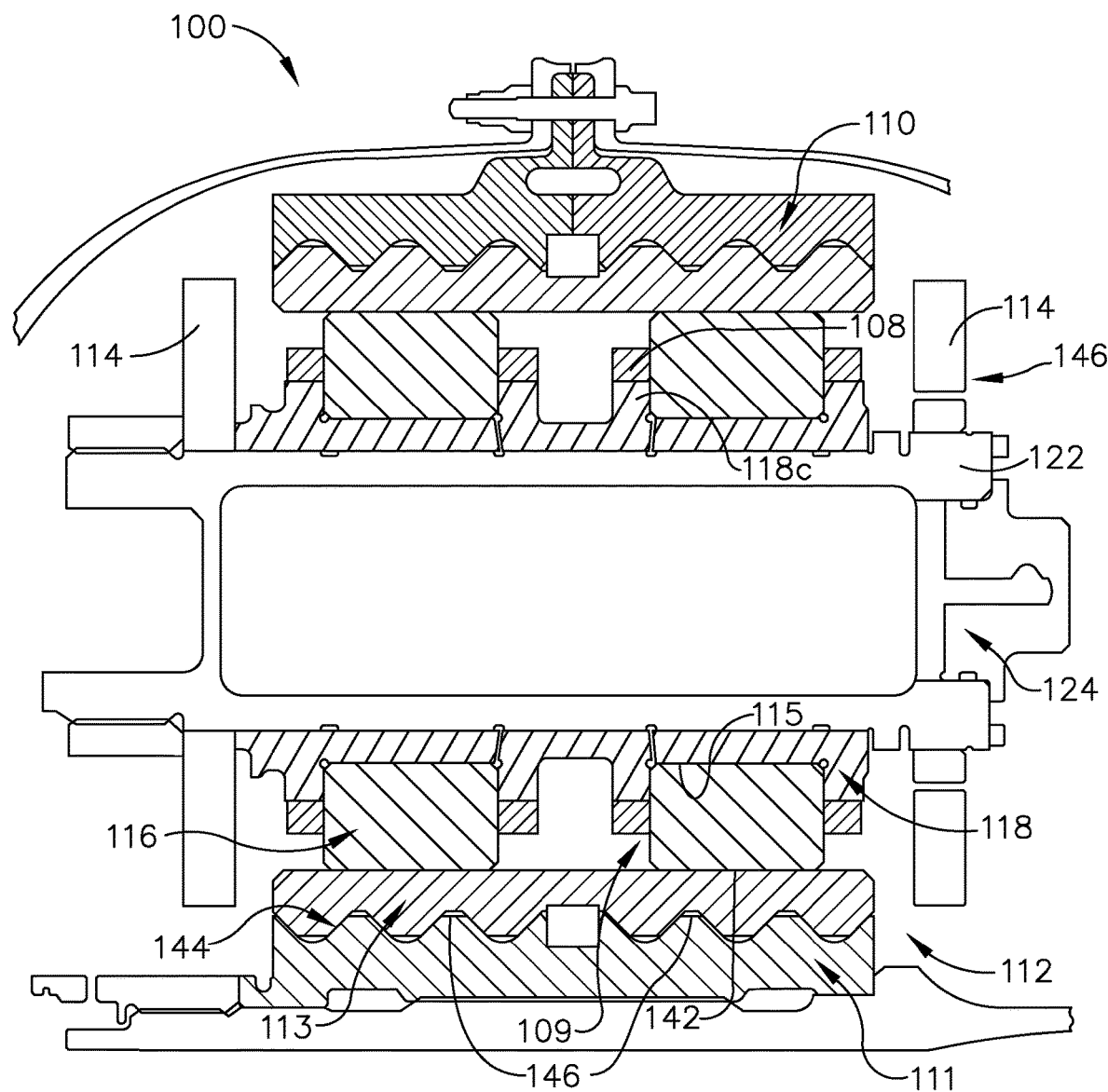
FIG. 3 is partial cross-sectional view of a gear assembly according to the prior art.

FIG. 3 depicts a partial cross-sectional view of a planet gear 112 housed in the gear assembly 100 as is generally known in the prior art. The planet gear 112 is housed by carrier 114 and has an outer ring 113 rotatable about planet rolling elements 116. There can be multiple rows of roller elements 116 carried by each planet gear. The outer ring 113 can include an outer surface 144 with a plurality of teeth 146 and an inner surface 142 that defines an outer race for the rolling elements 116. The planet gear 112 also comprises an inner ring 118 having an outer surface 115 defining an inner race for the rolling elements 116. The rolling elements 116, therefore, can be located between and in contact with the inner race of the inner ring 118 and the outer race of the outer ring 113. A pair of static wall elements 118*c* on the inner ring 118 can oppose the rolling elements 116, Cage elements 108 in an opening 109 can rotate with and define a cage, or support structure for guiding the rolling elements 116. The cage elements 108 can abut the outer surface 115 of the inner ring 118. A plurality of rolling elements 116 can be located in the cage such that the cage elements 108 guide the multiple rows of rolling elements 116. A conventional support shaft 122 is fit into the inner ring 118 and is connected by a spanner nut configuration 124 on the outer surface of the carrier 114 to hold the planet gear 112 within the carrier 114. The spanner nut configuration 124 is a complex structure that extends axially beyond the carrier 114 of the planet gear 112.

While FIG. 3 illustrates one configuration for housing a planet gear 112 to a carrier 114 of a gear assembly 100, there are generally many gear assembly configurations known in the art and embodiments described herein can be applicable to any configuration of a gear assembly. Moreover, while FIG. 3 illustrates the planet gear 112 having two rolling elements 116, it is possible that the planet gear 112 includes only one, or more than two rolling elements 116. The rolling elements 116 can be any suitable rolling elements such as roller bearings, spherical bearings, ball bearings, or fluid-film journal bearings.

Figure 4:
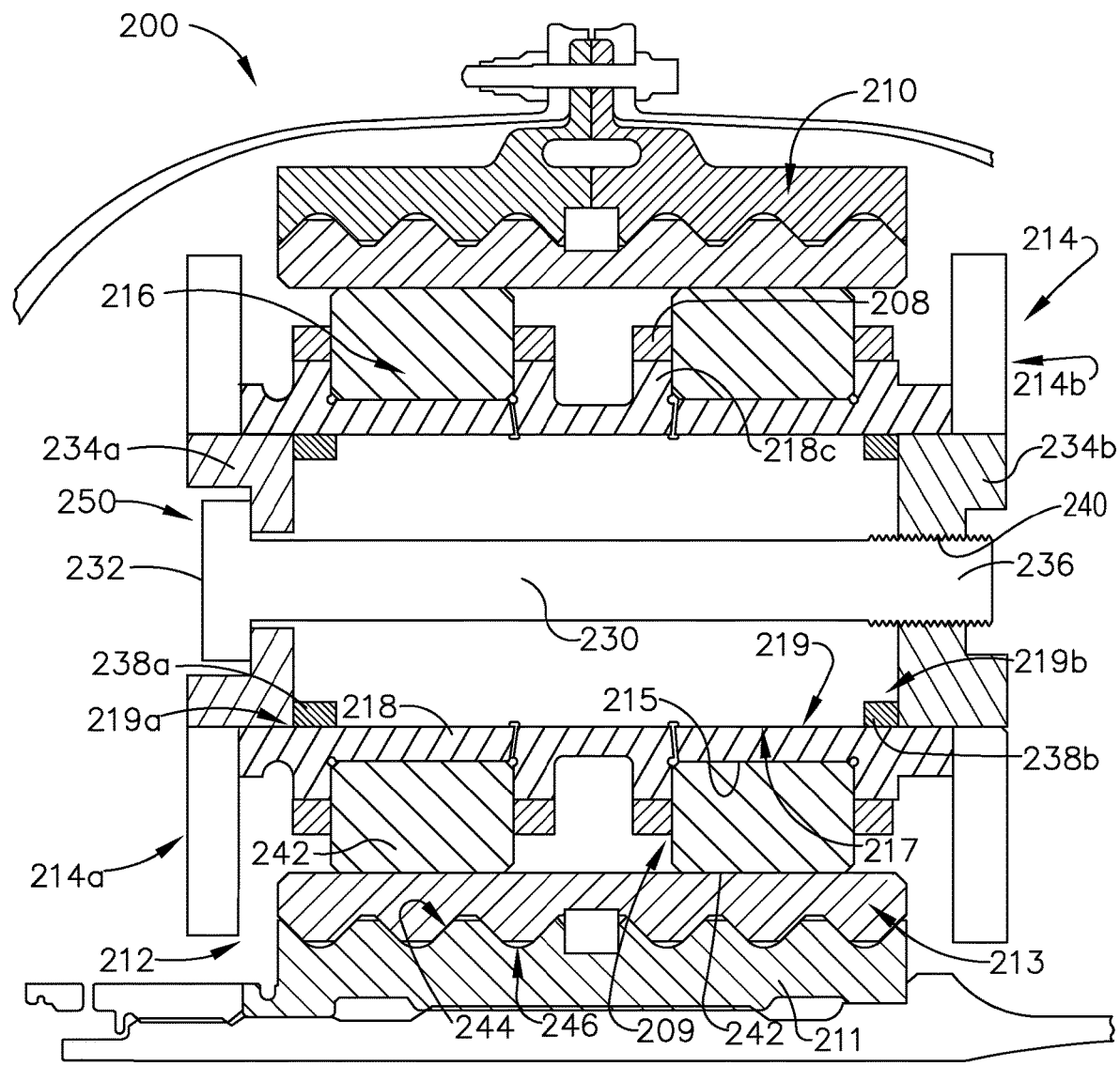
FIG. 4 is partial cross-sectional view of a gear assembly according to aspects described herein.

FIG. 4 is cross-sectional view of a planet gear 212 housed in a gear assembly 200 in accordance with the present disclosure. Since the gear assembly 200 is similar to the gear assembly 100; like parts will be identified with like numerals increased by 100, with it being understood that the description of the like parts of gear assembly 100 applies to gear assembly 200, unless otherwise noted.

In this illustration, the inner ring 218 has an inner surface 217 that defines a bore 219 having a first end 219*a* and a second end 219*b* axially spaced from the first end 219*a*. The first end 219*a* and second end 219*b* define a first opening and second opening for the bore 219, respectively. The carrier 214 includes a first radial wall 214*a* circumscribing the first end 219*a* and a second radial wall 214*b*, spaced apart from the first radial wall 214*a*, at the second end 219*b*. The inner ring 218 is disposed between the first radial wall 214*a* and the second radial wall 214*b*. The inner ring 218 circumscribes and carries a shaft in the form of first and second support elements 238*a*, 238*b* that are disposed adjacent a portion of the first end and seconds ends 219*a* and 219*b*, respectively. First and second retainers 234*a*, 234*b* can be located adjacent the first and second support elements 238*a*, 238*b* about the first and second ends 219*a*, 219*b* and are circumscribed by the carrier radial walls 214*a* and 214*b*, respectively. Additionally, the first and second retainers 234*a*, 234*b* can be coupled to the carrier radial walls 214*a* and 214*b*. The first and second retainers 234*a*, 234*b* can be in the form of a plug, which can be secured by a press fit in one of the first end 219*a* or second end 219*b* of the bore 219. Additionally, one of the first and second retainers 234*a*, 234*b* can include an aperture 250 that extends through the one of the first or second retainers 234*a*, 234*b* and into the bore 219.

A fastener 230 can securely connect the first and second retainers 234a, 234b. The fastener 230 can include a first end 232 and a second end 236. The first end 232 can define a head and the second end 236 can define threads. Furthermore, one of the first and second retainers 234a, 234b can include threads 240 for receiving the second end 236 of the fastener 230. The fastener 230 physically limits axial movement of the inner ring 218 and the carrier 214 by compressing the first and second retainers 234a, 234b against the first and second support elements 238a, 238b disposed about the inner surface 217 of the inner ring 218.

Advantages of the configuration of the gear assembly 200 compared to the prior art include the elimination of the spanner nut configuration 124 on the outer surface of the carrier 114. Thus, the width of the planet gear 212 is more narrow and compact than the planet gear 112. The reduced axial length of the planet gear 212 can allow for a reduced engine length. Furthermore, the configuration of gear assembly 200 does not include a traditional support shaft 122 thereby reducing part weight and complexity. A reduction in part weight is beneficial to reduce loads imparted to parts of the gear assembly 200.

A method of retaining a bearing assembly having an inner ring with first and second ends and support elements adjacent a portion of the first and second ends can include physically limiting the axial movement of the bearing assembly by first and second retainers mounted to the first and second end of support elements and having a fastener extending through the bearing assembly and connecting the retainers. Furthermore, the method can include the fastener compressing the first and second retainers against the first and second support elements disposed about the inner surface of the inner ring to physically limit the axial movement of the bearing assembly and the retainers.

Figure 5:
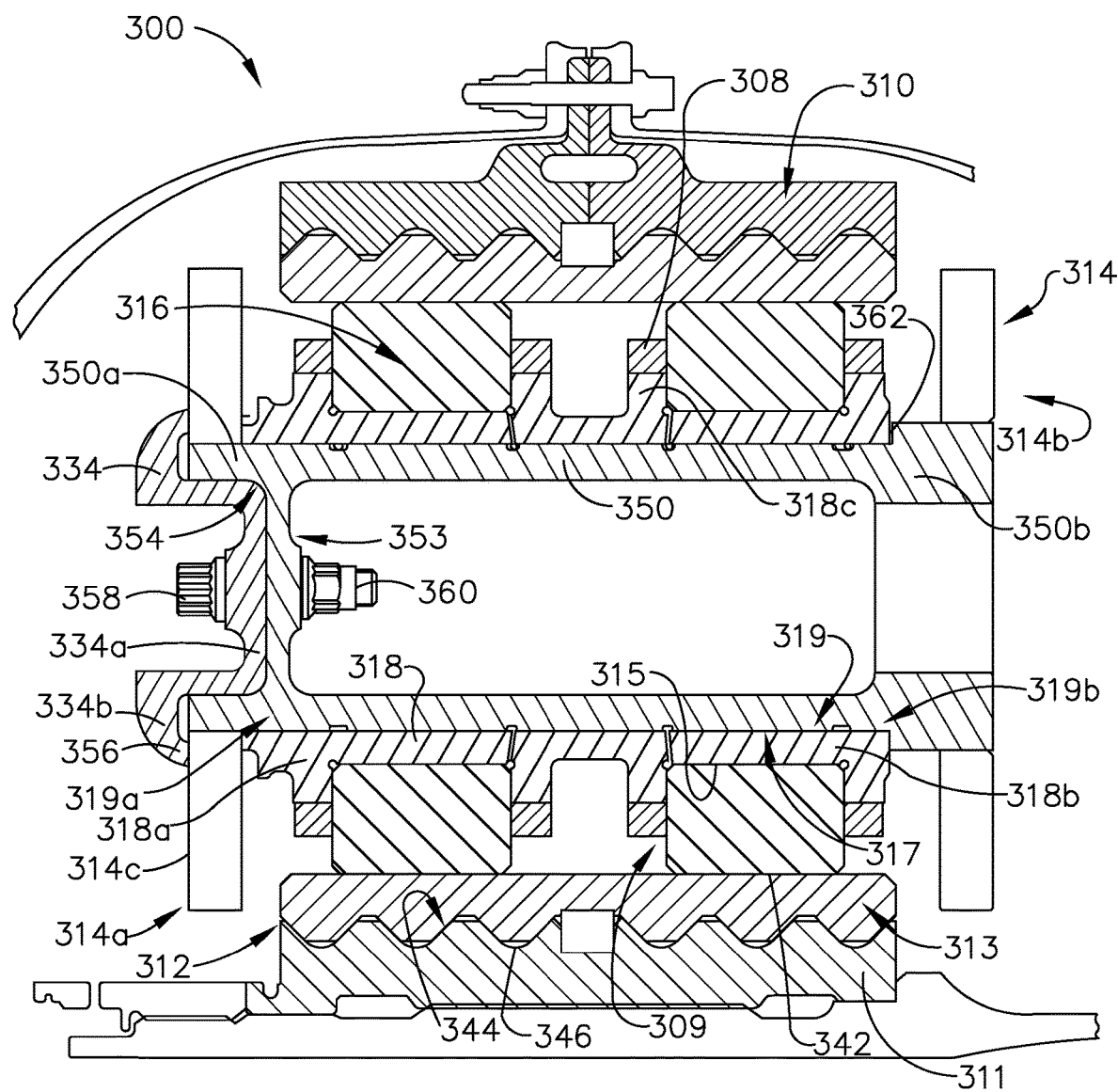
FIG. 5 is partial cross-sectional view of a gear assembly according to aspects described herein.

FIG. 5 is cross-sectional view of a planet gear 312 housed in a gear assembly 300 in accordance with a non-limiting embodiment of the present disclosure. Since the gear assembly 300 is similar to the gear assembly 100; like parts will be identified with like numerals increased by 200, with it being understood that the description of the like parts of gear assembly 100 applies to gear assembly 300, unless otherwise noted.

The inner ring 318 has an inner surface 317 that defines a bore 319 having a first end 319a and a second end 319b axially spaced from the first end 319a. The first end 319a and second end 319b define a first opening and second opening for the bore 319, respectively. A shaft 350 can extend through the bore 319 and can have first end 350a located in radial alignment with the first end 319a of the inner ring 318 and second end 350b located in radial alignment with the second end 319b of the inner ring 318. The shaft 350 can have a recess 354 at the first end 350a and a raised shoulder 362 at the second end 350b. The carrier 314 can circumscribe at least a portion of the shaft 350. The inner ring 318 can further include a first end 318a circumscribing at least a portion of the shaft 350 and abutting a portion of the carrier 314, and a second end 318b, spaced apart from the first end 318a and abutting the shoulder 362 of the shaft 350.

A retainer 334 can be located adjacent at least one end, such as the first end 350a. The retainer 334 can be in the form of a plug and can include a first end 334a, which can be secured by a press fit into the recess of the shaft 350. The plug, or retainer 334, can include a first end 334a and a second end 334b, where the first end 334a fits in the recess 354 in the first end 250a of the shaft 350, and the second end 334b includes a rim 356 circumferentially extending from the shaft 350 to the carrier 314. The rim 356 can press against an outer surface 314c of the carrier 314, thus compressing the inner ring 318 between the carrier 314 and the shoulder 362 of the shaft 350.

A fastener 358 can securely connect the retainer 334 and the shaft 350. A circumferential support wall 353 can be located in the shaft 350 and can include a threaded support member 360. The fastener 358 can thread into the threaded support member 360 and securely connect the retainer 334 and the circumferential support wall 353. The fastener 358 physically limits axial movement of the inner ring 318 and shaft 350 by pressing the rim 356 of the retainer 334 against the outer surface 314c of the carrier 314, which compresses the inner ring 318 between the carrier 314 and the shoulder 362.

Advantages of the configuration of the gear assembly 300 compared to the prior art include the elimination of the spanner nut configuration 124 on the outer surface of the carrier 114. Thus, the width of the planet gear 312 is more narrow and compact than the planet gear 112. The reduced axial length of the planet gear 312 can allow for a reduced engine length. While the configuration of gear assembly 300 includes a shaft 350, the shaft 350 has less axial length than the shaft 122, which can result in a reduction of part weight. Additionally, the configuration of the gear assembly 300 having the shaft 350 with a shoulder 362 that can be compressively retained by the retainer 334 and the carrier 314 reduces complexity.

A method of retaining a bearing assembly having a bore to a shaft received within the bore includes physically limiting the axial movement of the bearing assembly on the shaft by a retainer mounted to an end of the shaft and having a portion extending radially beyond the shaft and into an axial path of the bearing assembly. Furthermore, the method can include the shaft having a raised shoulder abutting the bearing assembly in the axial path. The bearing assembly can be compressed between a carrier at one end of the shaft and the raised shoulder by the retainer to physically limit the axial movement of the bearing assembly on the shaft.

It should be appreciated that application of the disclosed design is not limited to turbine engines with fan and booster sections, but is applicable to turbojets and turbo engines as well. Benefits of aspects described herein can include To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gear assembly, comprising:
an inner ring having an outer surface defining an inner race and an inner surface defining a bore and having a first end defining a first opening for the bore and a second end, axially spaced from the first end, defining a second opening to the bore;
an outer ring having an inner surface defining an outer race circumscribing and confronting the inner race and an outer surface with a plurality of teeth;
a plurality of rolling elements positioned between the inner race and the outer race;
a shaft extending through the bore and having at least one end;
a retainer located adjacent the at least one end wherein the retainer is press fit into a recess in the at least one end of the shaft;
a carrier circumscribing at least a portion of the shaft; and
a fastener securely connecting the retainer and the shaft and physically limiting axial movement of the carrier and the inner ring on the shaft.

2. The gear assembly of claim 1 wherein the retainer is a plug.

3. The gear assembly of claim 1, further comprising a circumferential support wall located in the shaft.

4. The gear assembly of claim 3, further comprising a threaded support member on one of the shaft or the retainer.

5. The gear assembly of claim 4 wherein the fastener threads into the threaded support member and securely connects the retainer and the circumferential support wall of the shaft.

6. A gear assembly, comprising:
an inner ring having an outer surface defining an inner race and an inner surface defining a bore and having a first end defining a first opening for the bore and a second end, axially spaced from the first end, defining a second opening to the bore;
an outer ring having an inner surface defining an outer race circumscribing and confronting the inner race and an outer surface with a plurality of teeth;
a plurality of rolling elements positioned between the inner race and the outer race;
a shaft extending through the bore and including a first shaft end comprising a recess and a second shaft end, spaced apart from the first shaft end, and comprising a raised shoulder;
a carrier circumscribing at least a portion of the shaft;
a retainer located adjacent the first shaft end, the retainer comprising a first retainer end press fit into the recess in the first shaft end and a second retainer end, spaced apart from the first retainer end, and comprising a rim circumferentially extending from the shaft to the carrier; and
a fastener securely connecting the retainer and the shaft and physically limiting axial movement of the carrier and the inner ring on the shaft;
wherein the first end of the inner ring circumscribes at least a portion of the shaft and abuts portion of the carrier, and the second end of the inner ring abuts the raised shoulder of the shaft.

7. The gear assembly of claim 6 wherein the rim presses against an outer surface of the carrier and compresses the inner ring between the carrier and the raised shoulder.

8. The gear assembly of claim 6, further comprising a circumferential support wall located in the shaft.

9. The gear assembly of claim 8, further comprising a threaded support member on one of the shaft or the retainer.

10. The gear assembly of claim 9 wherein the fastener threads into the threaded support member and securely connects the retainer and the circumferential support wall of the shaft.

* * * * *